Figure 1:
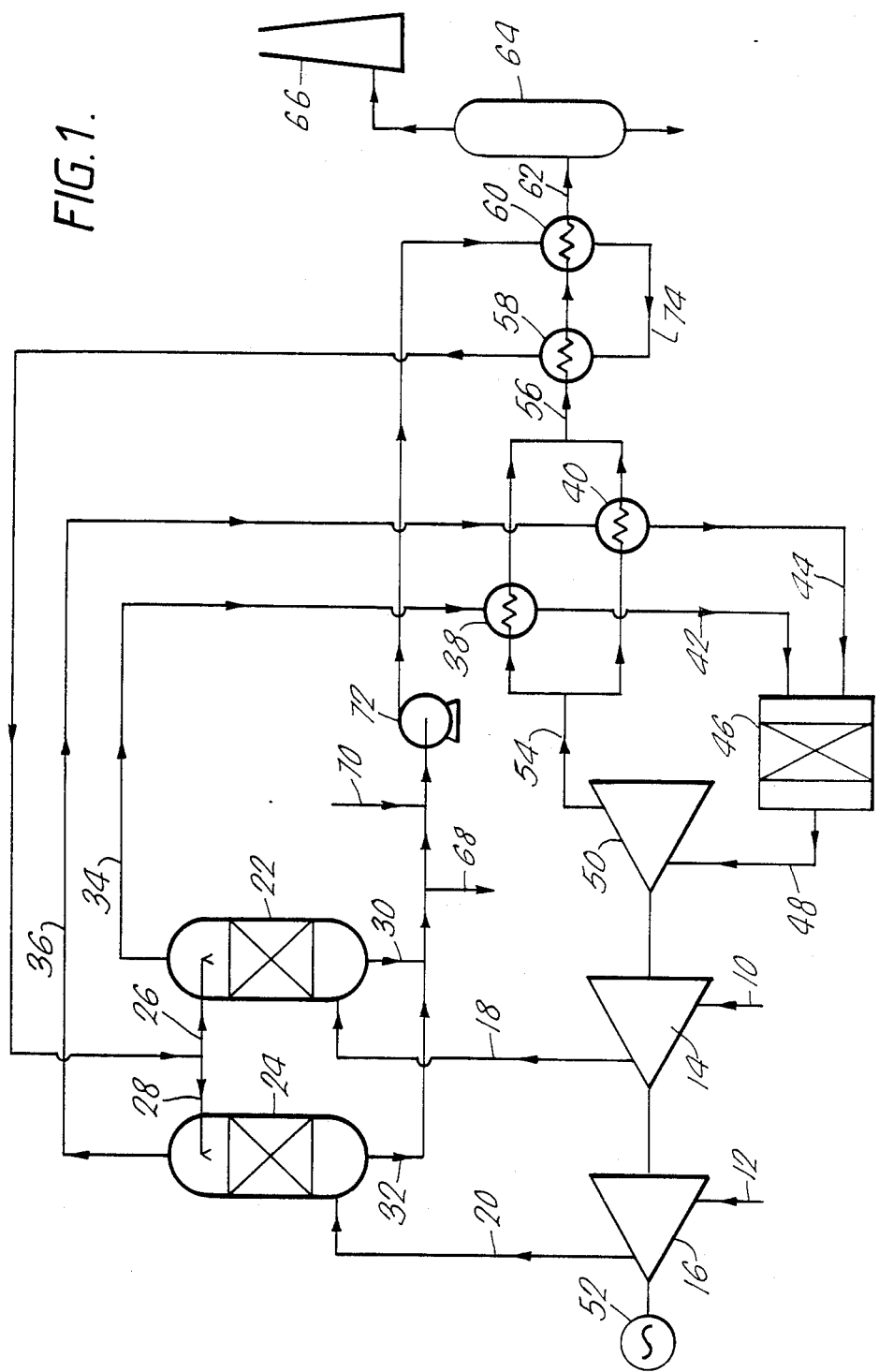

United States Patent [19]
Pinto

[11] Patent Number: 4,733,528
[45] Date of Patent: Mar. 29, 1988

[54] ENERGY RECOVERY

[75] Inventor: Alwyn Pinto, Middlesbrough, United Kingdom

[73] Assignee: Imperial Chemical Industries PLC, London, England

[21] Appl. No.: 868,748

[22] Filed: May 30, 1986

Related U.S. Application Data

[63] Continuation-in-part of Ser. No. 703,531, Feb. 20, 1985.

[30] Foreign Application Priority Data

| Mar. 2, 1984 | [GB] | United Kingdom | 8405591 |
| Jun. 4, 1984 | [GB] | United Kingdom | 8417016 |
| Jun. 4, 1984 | [GB] | United Kingdom | 8417017 |
| Oct. 9, 1984 | [GB] | United Kingdom | 8425508 |
| Jun. 4, 1985 | [GB] | United Kingdom | 8513997 |
| Jun. 18, 1985 | [GB] | United Kingdom | 8515392 |

[51] Int. Cl.⁴ ............................................. F02C 3/28
[52] U.S. Cl. ........................... 60/39.12; 60/39.02; 252/376; 423/648 R; 423/650; 423/652
[58] Field of Search .......................... 60/39.02, 39.12

[56] References Cited

U.S. PATENT DOCUMENTS

| 2,869,324 | 1/1959 | Foote | 60/39.02 |
| 3,731,485 | 5/1973 | Rudolph et al. | 60/39.02 |
| 3,868,817 | 3/1975 | Marion et al. | 60/39.02 |
| 4,202,167 | 5/1980 | Suggitt et al. | 60/39.02 |
| 4,224,299 | 9/1980 | Barber et al. | 423/359 |
| 4,264,567 | 4/1981 | Pinto | 423/359 |
| 4,448,018 | 5/1984 | Sayama et al. | 60/39.02 |
| 4,532,982 | 8/1985 | Nakamura | 60/39.02 |

FOREIGN PATENT DOCUMENTS

| 0051487 | 5/1982 | European Pat. Off. |
| 0086504 | 8/1983 | European Pat. Off. |
| 1228856 | 11/1986 | Fed. Rep. of Germany |
| 427411 | 6/1967 | Switzerland |
| 2153912 | 8/1985 | United Kingdom |

Primary Examiner—John Doll
Assistant Examiner—Wayne A. Langel
Attorney, Agent, or Firm—Cushman, Darby & Cushman

[57] ABSTRACT

Energy is recovered from low calorific value gas by means of a gas turbine. Heat is recovered from the turbine exhaust by indirect heat exchange with water. The resultant hot water is used to saturate the fuel and, optionally, also the combustion air, and/or to aid regeneration of an absorbent used in a wet process to remove carbon dioxide from the gas prior to combustion.

Preferably the low calorific value gas is waste gas from a PSA process used to remove impurities in the production of a hydrogen-containing gas stream from a raw gas made by primary/secondary steam reforming a hydrocarbon feedstock at superatmospheric pressure and the turbine drives the secondary reformer air compressor.

13 Claims, 3 Drawing Figures

ENERGY RECOVERY

This is a continuation-in-part of application Ser. No. 703,531 filed Feb. 20, 1985, pending.

This invention relates to energy recovery and in particular to the recovery of energy from gas streams of low calorific value. In some processes such gas streams are produced as byproducts or as waste products but, for an energy efficient overall process, recovery of the fuel value from the low calorific value gas stream is desirable. In some processes the fuel value of such low calorific value gas streams can be recovered by using the low calorific gas as part, or all, of the fuel required to fire a furnace used in the process. However in other processes no such fired furnace is employed and so this option is not available.

In the present invention the low calorific value gas is combusted, preferably catalytically, and the combustion products are used to power a turbine producing shaft power. In the process of the invention heat is also recovered from the exhaust gas from the turbine.

In operating a gas turbine it is necessary to compress large volumes of air as ballast gas in order to provide a sufficient mass flow through the expander and to avoid excessive temperatures, which would lead to unattainable specifications for materials of construction and to the production of exhaust gases having concentrations of nitrogen oxides above allowable limits. As a result a considerable fraction of the power generated by the expander is used in the compression of that air and is not available to external users. A second problem is that the expander exhaust gas is still hot, and accordingly it is common to cool it in a waste heat boiler; however, if steam at a pressure high enough to drive a steam turbine is to be produced, the exhaust gas leaving the waste heat boiler is still hot enough to justify further heat recovery, if this could be economically done.

In the present invention at least part of the excess of air normally used is replaced by steam obtained in a thermally efficient way.

According to a first embodiment of the present invention there is provided a process for the recovery of energy from a low calorific value fuel by the production of shaft power comprising combusting a fuel gas of calorific value of 15 to 1100 BTU/scf (0.6 to 41 MJ.m$^{-3}$) with air and expanding the resultant combustion products in an expander producing the shaft power wherein the air at the combustion zone inlet pressure is provided by a compressor driven by said shaft power, steam is added to the fuel gas, and optionally also to the combustion air, prior to combustion, by direct heat exchange with hot water at least part of which is obtained by indirect heat exchange of the expander exhaust gas with water under sufficient pressure to prevent boiling.

In an alternative embodiment of the invention where the low calorific value gas contains carbon dioxide, a process for the recovery of energy therefrom by the production of shaft power comprises removing carbon dioxide from said gas by contacting said gas with an aqueous solution of an absorbent for carbon dioxide, separating the resultant carbon dioxide-depleted gas having a calorific value of 15 to 1100 BTU/scf (0.6 to 41 MJ.m$^{-3}$) from said absorbent, regenerating said absorbent by heating, combusting said carbon dioxide-depleted gas as fuel gas with air and expanding the resultant combustion products in an expander producing the shaft power wherein the air at the combustion zone inlet pressure is provided by a compressor driven by said shaft power, steam is added to the fuel gas, before, during, and/or after, carbon dioxide removal, and optionally also to the combustion air, prior to combustion, by direct heat exchange with hot water under sufficient pressure to prevent boiling and heat is recovered by indirect heat exchange of the turbine exhaust gas and is used to heat the absorbent in the regeneration thereof.

In such a process the fuel gas prior to carbon dioxide removal preferably contains at least 20% by volume of carbon dioxide: if left in the fuel gas, the calorific value of the fuel gas would be too low for economic use in the process of the invention.

If necessary the shaft power can also compress the fuel gas to the required combustion zone inlet pressure; however in many cases the fuel gas will already be at a sufficient pressure.

The fuel gas may be methane, natural gas, or a gas containing higher hydrocarbons mixed with non-combustible gases such as nitrogen or carbon dioxide. The invention is more especially applicable to the use of fuels of low calorific value such as hydrogen or carbon monoxide and gas mixtures containing hydrogen and/or carbon monoxide such as producer gas, blast furnace gas, air/hydrocarbon partial oxidation gas, catalyst regeneration off-gas, pressure swing adsorption (PSA) waste gas, ammonia synthesis purge gas, off-gases from hydrogen enrichment of fresh ammonia synthesis gas (Braun process) or of ammonia synthesis purge gas (ICI AMV process), mine drainage gas, sewer gas, underground gasification gas, rich-mixture combustion gas, solvent-containing effluent gas, or anaerobic fermentation gas. Preferably the calorific value of the fuel gas, after any carbon dioxide removal step employed, is in the range 25 to 500 BTU/scf (0.9 to 19 MJ.m$^{-3}$), and particularly is below 300 BTU/scf (11 MJ.m$^{-3}$). The invention is of particular utility, as described below, where the fuel gas is a hydrogen-containing gas, for example, a waste gas from the production of hydrogen or ammonia (the waste gases produced in such processes in the course of removal of impurities often contain a proportion of hydrogen). The use of a hydrogen-containing gas as the fuel is often beneficial, particularly where the combustion is effected catalytically. If desired more than one fuel may be used. In particular a steam-free fuel can be used to generate a high temperature gas stream and a steam-saturated fuel fed to that stream as the main combustible component.

In the process of the invention the fuel gas stream and, optionally, the combustion air is saturated with water vapour; in some forms of the invention only the fuel gas is saturated.

The pressure at which the fuel gas is provided to the combustion zone is typically in the range 4 to 10 bar abs. As mentioned above, if necessary a portion of the shaft power produced may be used for the compression of the fuel gas to the desired combustion zone inlet pressure. At pressures in this range, a useful content of added steam, for example forming 30 to 60% by volume of the saturated fuel gas, can be obtained from contact with water at 130° to 200° C., at a pressure of 8 to 25 bar abs.

The combustion air can, if desired, contain additional oxygen or less oxygen than in ambient air, but not much advantage results from the use of air containing more than 40% by volume of oxygen (since too little steam can be introduced by contacting with water) or from the use of air containing less than about 15% by volume of oxygen (since then more power is consumed in compressing the gas to the combustion pressure). Where, as described below, air, oxygen-enriched, or oxygen-depleted, air is used elsewhere in the overall process, the combustion air is usefully of the same composition.

In the process of the invention, the excess of oxygen over combustible fuel need be less than in normal gas turbine practice, since the steam, incorporated into the fuel gas and, optionally, the combustion air, is providing ballast gas. The pressure at which the combustion air is provided is generally of the same order as that of the fuel gas, but provision may be made to mix the fuel gas and combustion air streams by injection, in which event the pressure of the streams may differ substantially.

Owing to the steam content of the saturated fuel gas and optionally, combustion air streams, these streams may be mixed safely upstream of the combustion zone, providing that the temperature is not too high and that there is no accidental combustion catalysis by the metal from which the plant is constructed.

The saturated fuel gas and/or combustion air should be heated to a temperature such that combustion takes place in the combustion zone. If the combustion is catalysed, or catalytically initiated, this temperature need not be very high and may be, for example as low as 200° C., calculated for the mixture before combustion, particularly where the fuel gas contains hydrogen. This heating can be, for example, by indirect heat exchange with the turbine exhaust gas, preferably before the indirect heat exchange producing the hot water. In an alternative procedure, warm, saturated, fuel gas can be fed into a hot oxygen-containing gas stream resulting from the combustion of fuel with an excess of air: in this case the second-mentioned fuel then preferably has a calorific value over 100 BTU/scf (3.7 MJ.m$^{-3}$) and is not saturated with water vapour. To facilitate combustion, the fuel gas preferably contains 4 to 20% by volume of hydrogen, calculated on a dry basis, at least at the start-up of the process.

Where the combustion is effected catalytically, the catalyst typically comprises platinum supported on a refractory oxide such as alumina. To avoid obstructing the gas flow, the support is preferably in the form of a honeycomb, with at least 15 through passages per square cm. Usually such catalysts have a primary support made of ceramic or refractory alloy with a secondary support applied as a washcoat to the rimary support. The active metal combustion catalyst is carried by the secondary support.

Where the combustion is catalytic, the combustion zone outlet temperature is suitably in the range 650° to 800° C., and the outlet gas will then contain substantially no nitrogen oxides since its temperature during combustion is not much higher than this.

In the turbine, expansion takes place from the inlet pressure, typically in the range 3 to 10 bar abs., to an outlet pressure, typically up to 2 cm Hg gauge depending on the local ambient pressure level and on whether water vapour can be condensed out of the exhaust gas before discharge to the atmosphere.

The turbine exhaust gas can, if desired, be partly cooled by heat exchange with fuel gas or combustion air or both. In any event it is heat exchanged with water under too great a pressure to permit boiling and to produce hot water: in one form of the invention the resultant hot water is used to effect saturation of at least the fuel gas, while in another form of the invention wherein carbon dioxide is removed from the fuel gas prior to combustion by a wet carbon dioxide removal process, the hot water is used for the regeneration of the carbon dioxide absorbent. Since the exhaust gas temperature after such heat exchange with water is typically under 100° C., not much heat can be recovered from it by direct heat exchange with water; this is however not excluded and the resulting warm condensate can be usefully recycled into the water system used to effect saturation. As described below, in some cases the heat recovered from the turbine exhaust gas is used in the overall process to heat an aqueous medium performing a function in addition to saturation of the fuel gas.

The advantageous energy economy of the process arises from the following factors (a) steam as ballast gas is provided by pumping hot water, which uses less power than would be needed to provide a corresponding excess of compressed air;

(b) the ballast steam is at a temperature corresponding to the partial pressure of steam in the saturated fuel, and where the combustion air is also saturated, in the combustion air; this temperature is substantially lower than that which would be needed to produce steam at the turbine inlet pressure; hence heat can be recovered from the turbine exhaust gas down to a lower temperature;

(c) since heat is recovered as hot water, it is a simple matter to recover useful power from other sources from which heat can be recovered as hot water; the hot water produced from such other sources can be added to the hot water obtained by heat recovery from the turbine exhaust gas. Also, since the combustor and turbine are designed to handle steam-containing gas, steam can be added as such, if available, and converted to useful power.

Since the heat exchange with water under pressure does not produce steam by phase separation, the risk of corrosion is much less than in a boiler and so the water need not be purified to boiler feed standards. The water can itself be a waste stream, for example from distillation of an aqueous solution such as crude alcohol, provided it does not contain impurities that would form scales or gums under the process conditions. If the water contains combustible impurities that can be volatilised, these will be combusted. Thus combustible water-containing waste streams such as fusel oil can be disposed of by using them to saturate the fuel gas.

As mentioned above, the invention is of particular utility where the fuel gas is a waste product from processes producing hydrogen-containing product gases, such as ammonia synthesis gas, or hydrogen for use in hydrogenation or reduction processes, e.g. "technical" hydrogen. In such processes the procedures employed for removal of impurities from the raw gas in order to give the product often give a waste gas stream containing combustible components including at least one of hydrogen, carbon monoxide, and methane, generally in admixture with at least one of nitrogen, carbon dioxide and argon. The impurity removal process may be cryogenic or PSA.

In one form of the invention the raw gas is obtained by reacting a carbonaceous feedstock with an oxygen containing gas, e.g. oxygen, air, oxygen-enriched, or oxygen-depleted, air, and, in many cases also with steam, at superatmospheric pressure to form a crude gas stream containing hydrogen, carbon oxides, small amounts of methane, and often steam and nitrogen and argon.

It is preferred that the turbine is employed to drive the compressor required to compress the oxygen-containing gas used in the reaction with the carbonaceous feedstock. Where, as is preferred the combustion air is of the same chemical composition as this oxygen-containing gas, the same compressor may be used for both compressions. However often it is desirable to compress the oxygen-containing gas used for the reaction with the carbonaceous feedstock to a greater degree than the combustion air. This may be usefully achieved by the use of a two or more stage compressor and taking the combustion air from a point between stages.

Often the crude gas resulting from the above reaction of a carbonaceous feedstock with an oxygen-containing gas and, optionally, steam is subjected to the catalytic shift reaction with steam, to convert carbon monoxide to carbon dioxide with the concurrent production of more hydrogen, to produce the raw gas.

The carbon dioxide is often removed from the raw gas prior to the separation of other impurities, for example by a "wet" process involving absorption of carbon dioxide in a suitable aqueous solvent followed by desorption of the carbon dioxide from the absorbent by heating and/or reduction in pressure followed by cooling and/or repressurisation of the absorbent solution. An excess of steam is also often removed prior to removal of carbon dioxide.

Carbon dioxide, as well as other impurities can also be removed by PSA. For example, as described in EP-A-157480, ammonia synthesis gas may be made from a raw gas containing an excess of nitrogen over that required for reaction with hydrogen, as well as carbon dioxide, methane, argon, and carbon monoxide as impurities by PSA. In the PSA process a waste gas containing this excess of nitrogen, together with the bulk of the impurities, is separated from the raw gas to give the product ammonia synthesis gas (which may however require a subsequent methanation step). A similar process may be employed for the production of technical hydrogen as described in UK patent application 8513997 corresponding to Pinto US serial No. (not known) filed on the same day as this application and bearing the reference B 33508. In those processes, the crude gas may be made by catalytic primary steam reforming a hydrocarbon feedstock in a heated furnace followed by reaction of the resulting primary reformed gas containing unreacted steam with air, oxygen-enriched, or oxygen-depleted, air, and passage of the reaction products over a secondary reforming catalyst in order to decrease the methane content of the reformed gas. In preferred forms of the processes described in those references, the primary reformer furnace is heated by the hot secondary reformed gas, and so no fired furnace is employed. A suitable primary reforming reactor configuration for such a process is described in European Patent Application No. 86301123.5 corresponding to Andrew et al U.S. Ser. No. 832,425 entitled "Steam reforming hydrocarbons" filed Feb. 24, 1986 and bearing the identification No. B 33397. It is fortunate that the heat balance of the two reforming stages is such that, when using air as the oxygen-containing gas in the secondary reforming stage, a suitable molar ratio of hydrogen plus carbon monoxide to nitrogen in the secondary reformer outlet gas can readily be attained to enable efficient impurity removal by a PSA process with a high hydrogen recovery. However the invention includes also the use of moderately enriched air containing up to 40% by volume of oxygen and also the use of oxygen depleted air containing down to 15% by volume of oxygen. Thermodynamic data permitting calculation of temperatures, pressures, and reactant proportions are readily available to chemical engineers.

The present invention is of particular utility in such processes where the heat required for the production of the crude gas is provided by the reaction of the feedstock with an oxygen-containing gas since, because there is no fired reformer furnace, the fuel value of the PSA waste gas cannot be recovered by using the PSA waste gas as part of all of the reformer furnace fuel. Instead, the PSA waste gas is used as the fuel gas to drive a turbine in accordance with the present invention. In particular, the power output of the turbine can be approximately equal to the power requirement of the compressor for the oxygen-containing gas employed in the reaction with the carbonaceous feedstock. The energy content of the PSA waste gas naturally will also depend on the extent of the shift reaction employed, since that will affect the carbon monoxide content of the PSA waste gas; on the purity of the unadsorbed PSA product stream, since that affects the flow rate of the waste was relative to the PSA product; and on the waste gas pressure. If a greater power output is required from combustion of the waste gas, for example in order to compress the PSA product gas, the process conditions may be adjusted, for example to give a higher waste gas fuel value.

By the term "approximately equal" in relation to the power output and power requirement, we mean that the power output is within ±10% of the power requirement. Thus we do not exclude the possibility of a small import of fuel gas, steam, or electricity to provide additional power for the compressor for the oxygen-containing as employed in the reaction with the carbonaceous feedstock, or the export of electricity produced by a generator driven by the turbine. Indeed, it is often preferable to arrange the process conditions to provide such an export of electricity in order to provide the power for auxiliary equipment such as water pumps.

The PSA waste gas from such processes has a relatively low calorific value, typically below 300 BTU/scf, i.e. 11 MJ.m$^{-3}$, and, especially where carbon dioxide is not removed therefrom before combustion, may be as low as 20 to 100 BTU/scf, i.e. 0.75 to 3.7 MJ.m$^{-3}$. Combustion of such low calorific value fuels is advantageously effected catalytically as described above. In some cases it may be desirable, as described below, to remove the carbon dioxide from the waste gas prior to combustion. This may be achieved by a wet carbon dioxide removal process, which may also serve to effect saturation of the gas fed to combustion. Prior to wet carbon dioxide removal and/or combustion, it may be necessary to compress the PSA waste gas. Also the air employed for the combustion will normally require compression. The compressors required for such compressions are conveniently powered by the turbine driven by the waste gas combustion products. The overall process conditions are preferably selected so that the combustion of the PSA waste gas provides that there is approximate equality, as aforesaid, between the power required for compression of the oxygen-containing gas used in the reaction with the carbonaceous feedstock and the net power obtained by the combustion of the PSA waste gas, i.e. after providing for such compression, if any, of the PSA waste gas and the combustion air.

Where the waste gas contains carbon dioxide, for example as in a PSA process as described above, as previously mentioned, it is often desirable to separate at least part of the carbon dioxide prior to use of the waste gas as the fuel gas fed to the combustion zone. This separation of carbon dioxide may be effected by a wet process as described above. As produced by the PSA stage, the waste gas is often at a relatively low pressure, e.g. 1.2 to 4 bar abs., and, for efficient wet carbon dioxide removal, a higher pressure, e.g. 5 to 10 bar abs., is desirable. Compression of the PSA waste gas, prior to "wet" carbon dioxide removal, may be effected, as described above, by a compressor driven by the turbine. In the wet carbon dioxide removal process the absorbent solution is preferably regenerated by heat exchange with the turbine exhaust gas: in this way the heat from the turbine exhaust is recovered producing hot water. Also since the PSA waste gas contacts the absorbent solution, the waste gas will at the same time become saturated with water vapour, ready for feeding to the combustion zone. However we do not preclude the use of an additional saturation step, wherein the carbon dioxide-depleted waste gas is contacted with hotter water, prior to feeding to the combustion zone. Prior to feeding the carbon dioxide-depleted absorbent back to the carbon dioxide absorption stage, the carbon dioxide-depleted absorbent is generally cooled, e.g. by indirect heat exchange with water. The resultant hot water may be used to saturate the carbon dioxide-depleted waste gas leaving the carbon dioxide absorption stage.

It is also possible to operate the PSA system to give two waste gas streams, one rich in carbon dioxide, and the other carbon dioxide-lean and containing the bulk of the combustible components, viz carbon monoxide, methane, and hydrogen, separated from the raw gas by the PSA stage. A PSA process giving carbon dioxide-rich and carbon dioxide-lean waste gas streams is described in EP-A-178833 and involves two depressurisation-to-waste stages, the first, preferably cocurrent, to an intermediate depressurisation pressure and giving the carbon dioxide-lean waste gas and the second, preferably counter-current, to the final, lowest, pressure and giving the dioxide-rich waste gas. Thus where it is desirable to employ a carbon dioxide-depleted fuel gas prior to combustion thereof, such a PSA process giving two waste gas streams may be employed and only the carbon dioxide-lean waste gas is subjected to combustion. Since it is at an intermediate depressurisation pressure, it may be used directly for combustion thus avoiding the need for compression of the waste gas prior to combustion.

Preferred processes and corresponding cycles and plants are shown in flowsheet form in the accompanying drawings wherein FIG. 1 involves saturation both of gaseous fuel and air and exhaust heat recovery partly by preheating of both saturated reactants.

Figure 2:
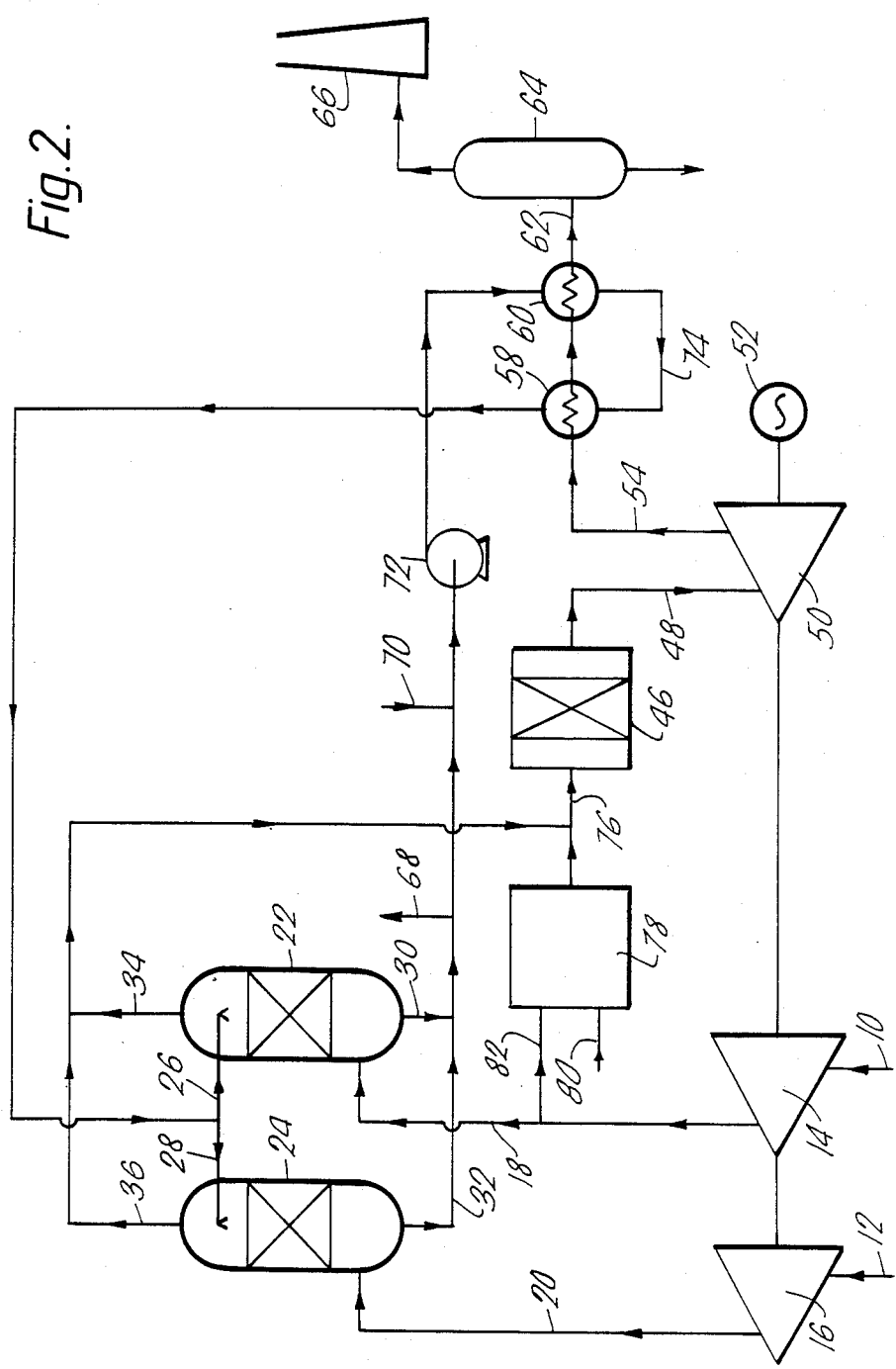

FIG. 2 involves saturation of the fuel and air, exhaust heat recovery by water heating only, and attainment of combustion zone inlet temperature by preliminary combustion.

Figure 3:
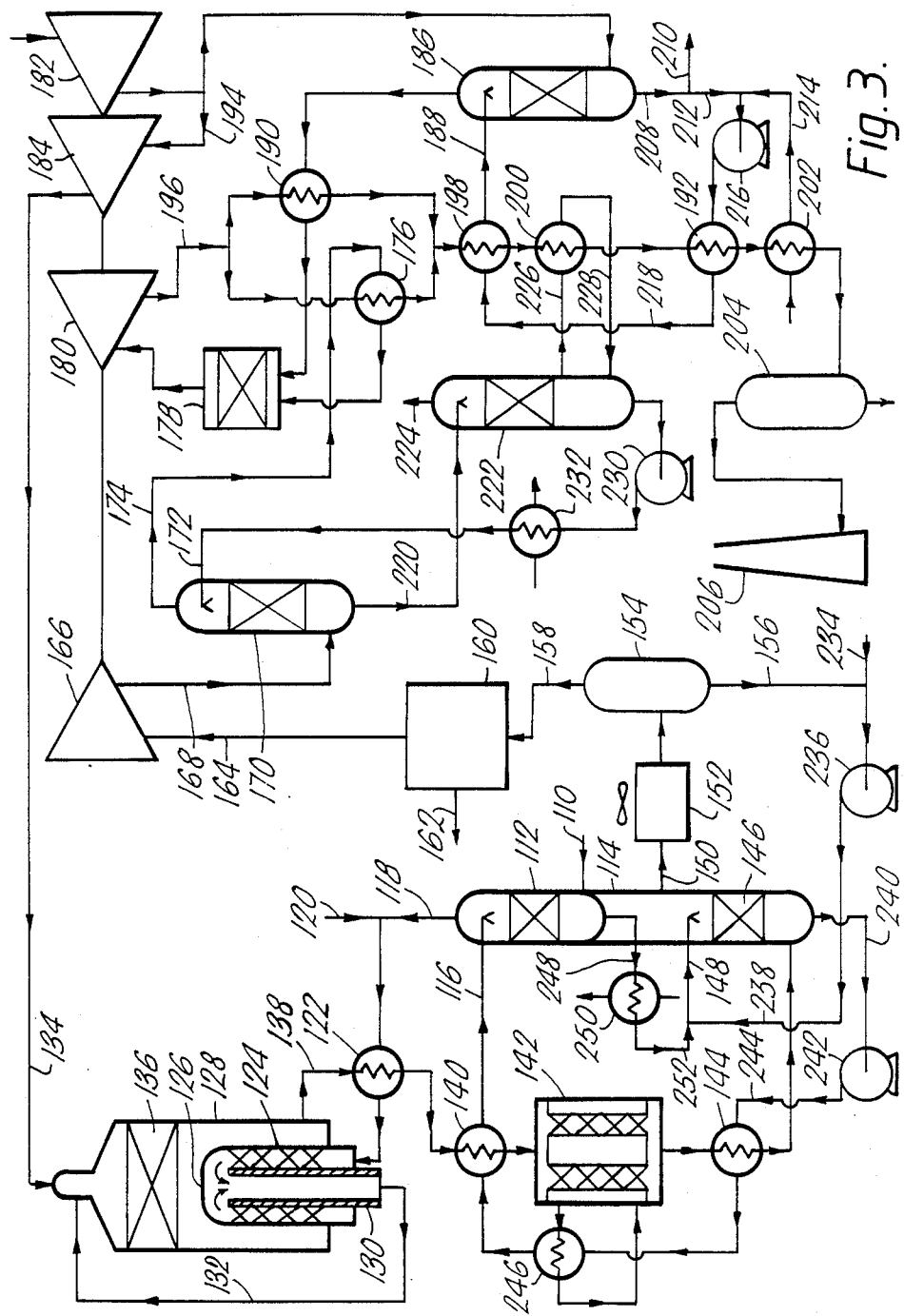

FIG. 3 involves an integrated process for the production of a hydrogen-containing product gas using a PSA process for the removal of impurities from the product, removal of carbon dioxide from the PSA waste gas by a wet process with consequent saturation of the PSA waste gas, and the use of the turbine to power the air compressor employed in the production of the crude gas from which the product gas is made. In this process the turbine exhaust gas is used to provide heat for regeneration of the carbon dioxide absorbent.

Calculated performance data for these processes are included in the description.

In the process of FIG. 1, air and low calorific value waste gas are fed, via lines 10 and 12, to compressors 14 and 16 respectively. The compressed gases are fed, via lines 18 and 20, to packed tower saturators 22 and 24 respectively wherein they contact streams of hot water flowing countercurrently and supplied via lines 26 and 28 respectively. Streams of cooled water are taken from the bottoms of saturators 22 and 24 via lines 30 and 32 respectively. Steam-saturated air and waste gas are taken overhead from the respective saturators via lines 34 and 36 and are superheated in heat exchangers 38 and 40 in heat exchange with turbine exhaust gas, and then fed, via lines 42 and 44, to a combustion zone 46 wherein they mix and react.

Combustion zone 46 can be of conventional design, for example in the form of a metal tube having provision for feeding a shielding gas (which may be part of the saturated air stream) along its walls, possibly with the aid of a perforated metal liner to set up a double layer of such gas; however, as a result of the low calorific value of the waste gas, and the content of steam, the flame temperature can be lower than in conventional combustion zones and hence the wall shielding provision can be less elaborate or indeed unnecessary. Combustion zone 46 as shown includes a catalyst, suitable in honeycomb form, to promote the combustion of the reaction mixture.

The resulting hot mixture is fed from combustion zone 46, via line 48, to a turbine 50 wherein it is expanded. Turbine 50 drives compressors 14 and 16, and an alternator 52 providing power for export. The exhaust gas from turbine 50 is fed, via line 54, to heat exchangers 38 and 40 where it acts as the source of heat for superheating the saturated air and waste gas. The partly cooled exhaust gas is fed, via line 56, to heat exchangers 58 and 60 where it heats water, and then is discharged, via line 62, to a catchpot 64 in which liquid water is separated before the exhaust gas is discharged to the atmosphere via stack 66.

The cooled water taken from saturators 22 and 24 via lines 30 and 32 are united and fed to a blow-down point at which a purge stream 68 is taken if unwanted materials such as scale-forming solutes or acidic materials are tending to accumulate in the water. The main stream of water is fed to a make-up point at which fresh water, which may include purified purge water, stream is added via line 70. The resultant water stream is then fed, via pump 72, to preliminary heat exchanger 60 and then, via line 74, to main heat exchanger 58 where it is heated by the turbine exhaust to the saturator inlet temperature. The resulting stream of hot water, which is at a pressure too high to permit boiling, is then divided and fed to saturators 22 and 24 via lines 26 and 28.

Table 1 shows temperature, pressure, and flow rates, for a process using as the fuel gas a PSA waste gas (from which carbon dioxide has partly been removed) resulting from the removal of impurities from a raw gas stream producing a hydrogen-containing product gas.

TABLE 1

| Stream | Temp. (°C.) | Press. (bar abs) | Flow rate (kg mol · h$^{-1}$) | | | | | | | |
|---|---|---|---|---|---|---|---|---|---|---|
| | | | CH$_4$ | O$_2$ | CO | CO$_2$ | H$_2$O | H$_2$ | N$_2$ | Ar |
| 18 | 130 | 6 | 0 | 272 | 0 | 0 | 0 | 0 | 1015 | 12 |
| 34 | 130 | 6 | 0 | 272 | 0 | 0 | 1041 | 0 | 1015 | 12 |
| 44 | 400 | 6 | 0 | 272 | 0 | 0 | 1041 | 0 | 1015 | 12 |
| 20 | 130 | 6 | 13 | 0 | 10 | 85 | 0 | 118 | 466 | 10 |
| 36 | 140 | 6 | 13 | 0 | 10 | 85 | 576 | 118 | 466 | 10 |
| 42 | 400 | 6 | 13 | 0 | 10 | 85 | 576 | 118 | 466 | 10 |
| 48 | 730 | 5.5 | 0 | 182 | 0 | 108 | 1761 | 0 | 1481 | 22 |
| 54 | 457 | 1.02 | 0 | 182 | 0 | 108 | 1761 | 0 | 1481 | 22 |
| 56 | 189 | 1.02 | 0 | 182 | 0 | 108 | 1761 | 0 | 1481 | 22 |
| 62 | 63 | 1.02 | 0 | 182 | 0 | 108 | 1761 | 0 | 1481 | 22 |
| 26 | 180 | 20 | 0 | 0 | 0 | 0 | 7255 | 0 | 0 | 0 |
| 30 | 102 | 6 | 0 | 0 | 0 | 0 | 6214 | 0 | 0 | 0 |
| 28 | 180 | 20 | 0 | 0 | 0 | 0 | 4445 | 0 | 0 | 0 |
| 32 | 113 | 6 | 0 | 0 | 0 | 0 | 3869 | 0 | 0 | 0 |

In this example the total power output of the turbine is 9.8 MW, of which 1.22 MW are used in compressing the combustion air and 0.44 MW are used in compressing the waste gas from its supply pressure of 3 bar abs. The heat transferred into the fuel gas and the combustion air by direct heat exchange with the hot water is as follows:

combustion air saturation: 43.7 GJ.h$^{-1}$, i.e. 12.14 MW fuel saturation: 23.1 GJ.h$^{-1}$, i.e. 6.42 MW In the process of FIG. 2 the flow sheet is similar to that of FIG. 1 except that the heat exchangers 38 and 40 are omitted and the saturated air and fuel gas streams are fed, via lines 34 and 36, to a combustion zone 46 inlet line 76. In order to heat the saturated combustion air and fuel gas streams 34 and 36 to the required combustion inlet temperature, a preliminary combustion zone 78 is provided. This is fed with natural gas as fuel, via line 80, and a minor part stream 82 of compressed air from compressor 14, the rest of the compressed air being fed, via line 18, to saturator 22. The combustion products from preliminary combustion zone 78 are fed, via line 84, to the combustion zone 46 inlet 76 in order to give the total gas entering combustion zone 46 an inlet temperature high enough to permit combustion to take place on a supported platinum catalyst in combustion zone 46.

Table 2 shows temperatures, pressures, and flow rates, for a process operated in accordance with the FIG. 2 flowsheet using as the fuel gas the same gas as in the previous embodiment set out in Table 1.

The total output of the turbine is 9.85 MW, of which 1.5 MW are used for compressing combustion air and 0.44 MW is used in compressing the fuel gas from its supply pressure of 3 bar abs. The heat transferred to the combustion air and fuel gas stream by direct heat exchange with hot water is as follows:

combustion air saturation: 35.5 GJ.h$^{-1}$, i.e. 9.86 MW fuel saturation: 23.1 GJ.h$^{-1}$, i.e. 6.42 MW

TABLE 2

| Stream | Temp. (°C.) | Press. (bar abs) | Flow rate (kg mol · h$^{-1}$) | | | | | | | |
|---|---|---|---|---|---|---|---|---|---|---|
| | | | CH$_4$ | O$_2$ | CO | CO$_2$ | H$_2$O | H$_2$ | N$_2$ | Ar |
| 18 | 130 | 6 | 0 | 221 | 0 | 0 | 0 | 0 | 824 | 10 |
| 34 | 130 | 6 | 0 | 221 | 0 | 0 | 845 | 0 | 824 | 10 |
| 20 | 130 | 6 | 13 | 0 | 10 | 85 | 0 | 118 | 466 | 10 |
| 36 | 140 | 6 | 13 | 0 | 10 | 85 | 576 | 118 | 466 | 10 |
| 80 | 40 | 6 | 45 | 0 | 0 | 0 | 0 | 0 | 0 | 0 |
| 82 | 130 | 6 | 0 | 126 | 0 | 0 | 0 | 0 | 469 | 5 |
| 84 | 1674 | 6 | 0 | 36 | 0 | 45 | 90 | 0 | 469 | 5 |
| 76 | 417 | 6 | 13 | 257 | 10 | 130 | 1511 | 118 | 1759 | 25 |
| 48 | 730 | 5.5 | 0 | 167 | 0 | 153 | 1655 | 0 | 1759 | 25 |
| 54 | 455 | 1.02 | 0 | 167 | 0 | 153 | 1655 | 0 | 1759 | 25 |
| 62 | 76 | 1.02 | 0 | 167 | 0 | 153 | 1655 | 0 | 1759 | 25 |
| 26 | 180 | 20 | 0 | 0 | 0 | 0 | 5875 | 0 | 0 | 0 |
| 30 | 102 | 6 | 0 | 0 | 0 | 0 | 5030 | 0 | 0 | 0 |
| 28 | 180 | 20 | 0 | 0 | 0 | 0 | 4445 | 0 | 0 | 0 |
| 32 | 113 | 6 | 0 | 0 | 0 | 0 | 3869 | 0 | 0 | 0 |

In the flow sheet of FIG. 3, desulphurised natural gas is fed, via line 110, to the upper (saturator) section 112 of a tower 114. Here the natural gas contacts a hot water stream, fed to the saturator via line 116, flowing down the packing in the upper section 112. The saturated gas leaves the saturator via line 118 and then, if steam is available for import, mixed with more such imported steam supplied via line 120.

The resultant warm steam/gas mixture, which typically has a steam/gas volume ratio of 2 to 5, a temperature of 150° to 250° C., and a pressure of 25 to 50 bar abs., is then preheated in a heat exchanger 122, typically to 350° to 550° C., and fed into ammular beds of primary reforming catalyst, typically supported nickel or cobalt, disposed in tubes 124 (only one of which is shown: in practice there will be a large number of such tubes), each having an upper closed end 126, heated in a furnace 128. The resulting hot gas, now typically at 600° to 800° C. and containing carbon monoxide, carbon dioxide, hydrogen, unreacted steam, and several percent of methane, passes into the closed end 126 of the tube 124 and returns through an inner tube 130 which is insulated from the bed of reforming catalyst so that there is minimal heat exchange with the reacting gas in the annular catalyst bed.

The primary reformed gas is then fed via line 132 into the uppermost (combustion) section of the furnace 128 where it is mixed, at a burner, with air fed via line 134. A flame is formed and the combustion products are brought towards equilibrium at a lower methane content over a secondary reforming catalyst 136. The resulting secondary reformed gas, now typically at 900° to 1050° C., passes passed the tubes 124 and so provides the heat required for the primary reforming occurring therein. In heat exchange with these tubes the secondary reformed gas is cooled, typically to 450° to 650° C.

The secondary reformed gas leaves furnace 128 via line 138 and is cooled in heat exchanger 122 and a water heater 140 to the shift inlet temperature. It then passes into a water-cooled shift reactor 142 in which the shift catalyst is disposed in tubes surrounded by water in a pressure shell. In shift reactor 142 the shift reaction is brought substantially to equilibrium at a temperature controlled at typically in the range 230° to 280° C. giving an outlet carbon monoxide content in the range 0.1 to 1% by volume on a dry basis. The shift outlet temperature is preferably 10° to 30° C. lower than the inlet temperature.

The shifted gas is then cooled in heat exchanger 144, passed into the lower packed de-saturation zone 146 of tower 114 where it contacts cool water fed in via line 148. The resulting water-depleted gas stream leaves desaturator 146 via line 150 and is cooled in cooler 152 to below the dew point of steam and passed into catchpot 154. Here liquid water is separated and removed via line 156 and dry gas is taken overhead via line 158 and passed to a PSA system 160.

PSA system 160 includes beds of adsorbent material such as active carbon or a molecular sieve on which carbon dioxide is strongly absorbed, hydrogen is very weakly, if at all, absorbed, and nitrogen, carbon monoxide, methane, and argon, are at least partly adsorbed. The PSA system includes beds under regeneration, i.e. being purged and repressurised, and undergoing treatments such as pressure equalisation and depressurisation, and the necessary changeover valves. From the PSA system a technical hydrogen product stream is passed out via line 162 to a user. Also a PSA waste gas stream is passed out via line 164.

The PSA waste gas, which contains nitrogen, carbon dioxide, carbon monoxide, methane, argon, and some hydrogen, is fed via line 164 to a compressor 166 (unless its pressure is already high enough) and then, via line 168, to a carbon dioxide removal column 170 wherein it is contacted with a regenerated aqueous solution containing an absorbent for carbon dioxide and typically at a temperature of 60° to 80° C. fed into column 170 via line 172. Carbon dioxide is absorbed from the PSA waste gas and the resulting carbon dioxide-depleted gas, which will now be saturated with water, is fed, via line 174, to a heat exchanger 176, and thence to a catalytic combustor 178 feeding hot gas to a turbine 180. The turbine 180 provides shaft power for a two-stage air compressor 182, 184 and PSA waste gas compressor 166. The low pressure stage 182 of the air compressor supplied air, via saturator 186 where it is saturated with hot water supplied via line 188 where it is exchanger 190 and 192, to the combustor 178 inlet. The low pressure stage 182 of the air compressor also provides a feed, via line 194, to the high pressure stage 184 of the air compressor where it is compressed to the process air presure and fed to the secondary reformer via line 134.

Exhaust gas from the turbine 180 is fed, via line 196, to heat exchangers 176 and 190 where it acts as the source of heat for superheating the saturated air and carbon dioxide-depleted waste gas. The partly cooled exhaust gas is cooled further in heat exchangers 198, 200, 192, and 202, and then is discharged to a catchpot 204 in which liquid water is separated before the exhaust gas is discharged to the atmosphere via stack 206.

Cooled water is taken as bottoms from saturator 186 via line 208 and is fed to a blow-down point at which a purge stream 210 is taken. The main stream of water is fed, via line 212, to a make-up point at which fresh water, heated in heat exchanger 202, is added via line 214. The resultant water stream is then fed, via pump 216, to preliminary heat exchanger 192 and then, via line 218, to main heat exchanger 198 where it is heated by the turbine exhaust to the saturator inlet temperature. The resulting stream of hot water, which is at a pressure too high to permit boiling, is then fed to saturator 186 via line 188.

The carbon dioxide-loaded absorbent solution, taken from column 170 via line 220, is fed to a column 222 where its pressure is reduced so that carbon dioxide is desorbed therefrom. The desorbed carbon dioxide is taken as overheads from column 222 via line 224. A part stream of the thus partly regenerated absorbent solution is taken from column 222 via line 226 and passed through heat exchanger 200 where it is heated by the turbine exhaust gas and returned to column 222 via line 228. This serves to heat the absorbent solution in column 222 to aid more complete desorption of carbon dioxide therefrom. Carbon dioxide-lean absorbent is the taken from column 222 and compressed back to the waste gas inlet pressure by pump 230 and returned to column 170 via cooler 232 and line 172. Hot water produced in cooler 232 may be used to feed a saturator (not shown interposed in line 174.

Cold condensate as the bottoms of catchpot 154 is fed, via line 156, together with make up water fed via line 234, to pump 236 and then, via line 238, into a cool water stream which is then fed via line 148 into the lower (desaturator) packed section 146 of tower 114. Here the unreacted steam in the shifted gas from shift reactor 142 condenses into the water, giving a warm water stream which is taken as bottoms, via line 240, and fed, via pump 242 and line 244, to three heating stages, viz. indirect heat exchanger with shifted gas in heat exchanger 144, then, in a heat exchanger 246, with condensing steam raised in shift reactor 142, and then with partly cooled secondary reformed gas in heat exchanger 140. The water stream may then still be entirely liquid or may be partly boiling and is fed, via line 116, to the saturation zone 112 in the upper section of the tower 114. The cooled water remaining after contacting the natural gas in the upper section of tower 114 is fed, via line 248 to a heat exchanger 250 where it is cooled by heat exchange with boiler feed water to be fed to a de-aerator (not shown); the cooled water is then fed, via line 252, to be mixed with cold condensate fed via line 238, and fed to line 148.

In a specific calculated example of the process, 1400 kg mol.h$^{-1}$ of natural gas (calculated as carbon atoms in a mixture of 92.7% by volume methane and 7.3% by volume ethane) are reacted with 3500 kg mol.h$^{-1}$ of steam over the catalyst in tubes 124 and the product of that reaction is reacted with air providing 620 kg mol.h$^{-1}$ of oxygen, brought to reforming equilibrium over catalyst 136, cooled and brought to shift equilibrium at an outlet temperature of 230° C. in reactor 142. Finally the gas is cooled, largely freed of wate vapour in catchpot 154, and subjected to PSA separation in the PSA system 160. Table 3 below shows the flow rates, temperatures, and pressures, of the inlet, i.e. raw, gas, product gas, and waste gas of the PSA stage.

TABLE 3

| Stream | Temp. (°C.) | Press. (bar abs) | Flow rate (kg mol · h⁻¹) | | | | | |
|---|---|---|---|---|---|---|---|---|
| | | | CO | CO$_2$ | H$_2$ | CH$_4$ | N$_2$ | Ar |
| inlet | 35 | 35 | 25 | 1285 | 4246 | 38 | 2354 | 49 |
| product | 40 | 34 | — | — | 3736 | — | 116 | 34 |
| waste | 30 | 1.5 | 25 | 1285 | 510 | 38 | 2238 | 15 |

The carbon monoxide content of the product is 100 ppm by volume. The hydrogen recovery is 88%. The waste gas has a calorific value of 49.3 BTU/scf (1.84 MJ.m$^{-3}$).

The waste gas is compressed to 3.0 bar abs. by compressor 166 and carbon dioxide is then removed from the waste gas using methyl diethanolamine as the absorbent with an absorbent temperature of 60° C. in column 170. The carbon dioxide-depleted fuel gas has a water vapour content of 5.5% by volume and contains 19.9% by volume of carbon dioxide. The amount of combustion air fed to saturator 186 is 1800 kg mol.$^{-1}$ and, after saturation, has a water vapour content of 45% by volume and a temperature of 108° C. The saturated fuel gas and air are heated to 400° C. in heat exchangers 176 and 190. Enough heat is recovered in heat exchanger 198 to maintain the temperature of the absorbent solution in column 222 at 80° C.

The net power output from the turbine is in substantial balance with the power requirement of the two stage air compressor.

I claim:

1. A process for the recovery of energy by the production of shaft power from a fuel gas comprising:
   carbon dioxide; and
   at least one combustible gas selected from:
      methane;
      hydrogen; and
      carbon monoxide; said fuel gas having a composition such that its calorific value is below 1100 BTU/scf (41 MJ.m$^{-3}$) and containing at least 20% by volume of carbon dioxide; said process comprising:
   (a) contacting said gas with an aqueous solution of an absorbent for carbon dioxide, whereby carbon dioxide is absorbed from said gas into said absorbent solution and the resultant carbon dioxide depleted gas is saturated with water vapor;
   (b) separating the saturated carbon dioxide-depleted gas from said absorbent, so as to give a saturated carbon dioxide depleted gas having a calorific value of 15 to 1100 BTU/scf (0.6 to 41 MJ.m$^{-3}$);
   (c) regenerating said absorbent by heating, and returning the regenerated absorbent to step (a);
   (d) compressing air in a compressor;
   (e) combusting said carbon dioxide-depleted gas with said compressed air in a combustion zone;
   (f) expanding the resultant combustion products in an expander driving said compressor and producing the shaft power; and
   (g) recovering heat from the turbine exhaust gas by indirect heat exchange and using said recovered heat to heat the absorbent in the regeneration thereof.

2. A process according to claim 1 wherein the carbon dioxide depleted gas has a calorific value below 300 BTU/scf (11 MJ/m$^{-3}$).

3. A process according to claim 1 wherein the carbon dioxide depleted gas is combusted catalytically.

4. A process according to claim 1 wherein the fuel gas is compressed prior to combustion by a compressor driven by said turbine.

5. A process according to claim 1 wherein the fuel gas contains hydrogen.

6. A process according to claim 5 wherein the low calorific value gas is waste gas from a pressure swing adsorption process producing a hydrogen-containing product.

7. A process according to claim 6 wherein the raw gas fed to the pressure swing adsorption process is made by reacting, at superatmospheric pressure, a carbonaceous feedstock with an oxygen-containing gas, and, optionally, also with steam.

8. A process according to claim 7 wherein the carbonaceous feedstock is a hydrocarbon feedstock and is catalytically primary steam reformed, the resultant primary reformed gas, containing an excess of steam, is mixed with an oxygen-containing gas and subjected to catalytic secondary steam reforming, and the heat required for the primary steam reforming is supplied by the secondary reformer outlet gas.

9. A process according to claim 8 wherein the turbine provides the power required to compress the oxygen-containing gas used in the reaction with the carbonaceous feedstock.

10. A process according to claim 9 wherein the process conditions are selected such that there is approximate equality between the power required to compress the oxygen-containing gas and the net power output of the turbine.

11. A process according to claim 1 wherein the carbon dioxide depleted gas is saturated with steam by direct heat exchange with hot water heated by indirect heat exchange of the turbine exhaust gas with water under sufficient pressure to prevent boiling.

12. A process according to claim 1, wherein the compressed air is saturated with steam by direct heat exchange with hot water heated by indirect heat exchange of the turbine exhaust gas with water under sufficient pressure to prevent boiling.

13. A process according to claim 1, wherein the compressed air and/or the carbon dioxide depleted gas is heated, prior to entering the combustion zone, by heat exchange with the turbine effluent.

* * * * *